(No Model.) 4 Sheets—Sheet 1.

H. W. STOW, Dec'd.
T. F. BOOTH, Administrator.
MACHINE FOR RIPPING OR DIVIDING BOARDS.

No. 518,655. Patented Apr. 24, 1894.

Witnesses
E. J. Nottingham
G. F. Downing

Inventor
Henry W. Stow
By H. A. Seymour
Attorney

THE NATIONAL LITHOGRAPHING COMPANY,
WASHINGTON, D. C.

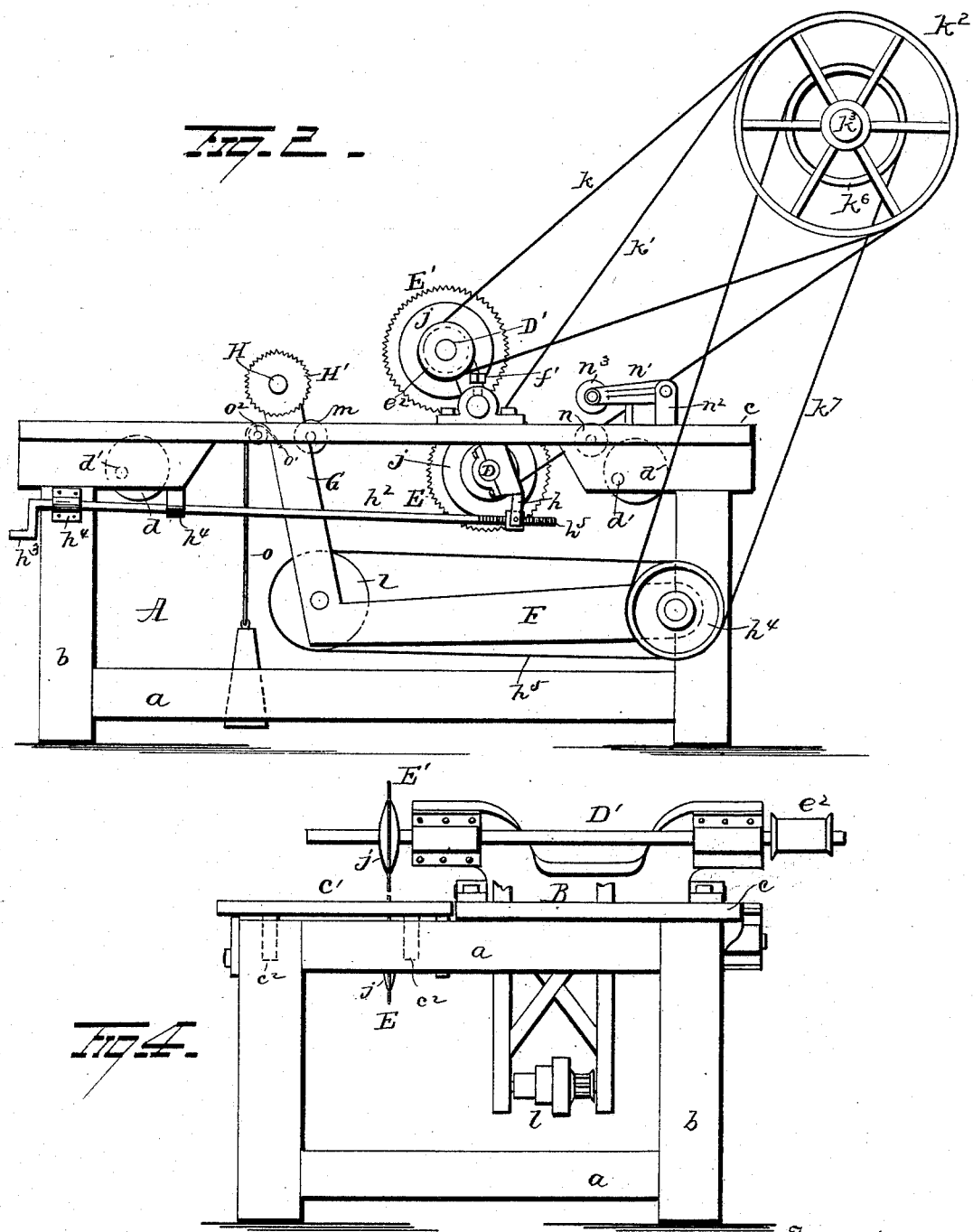

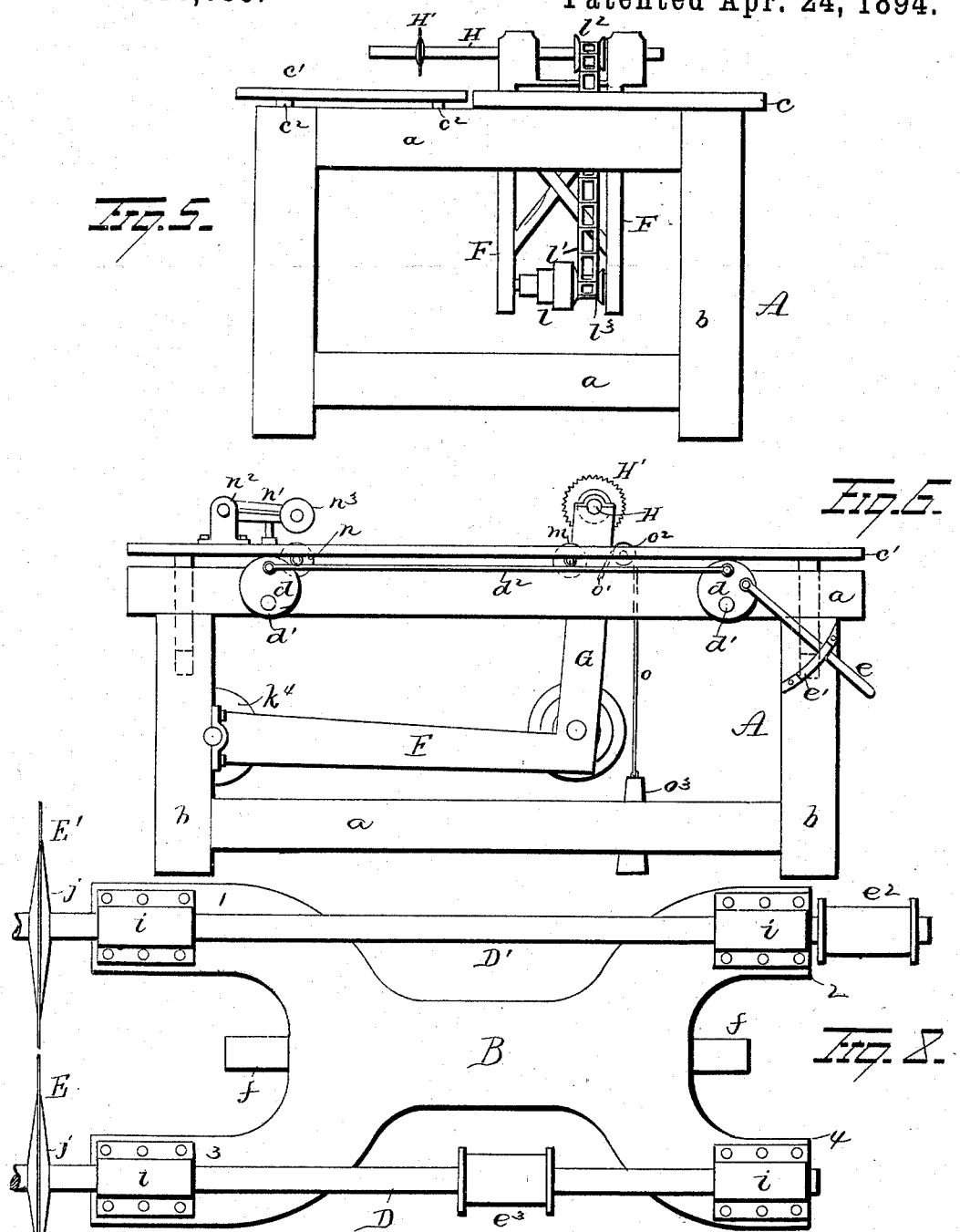

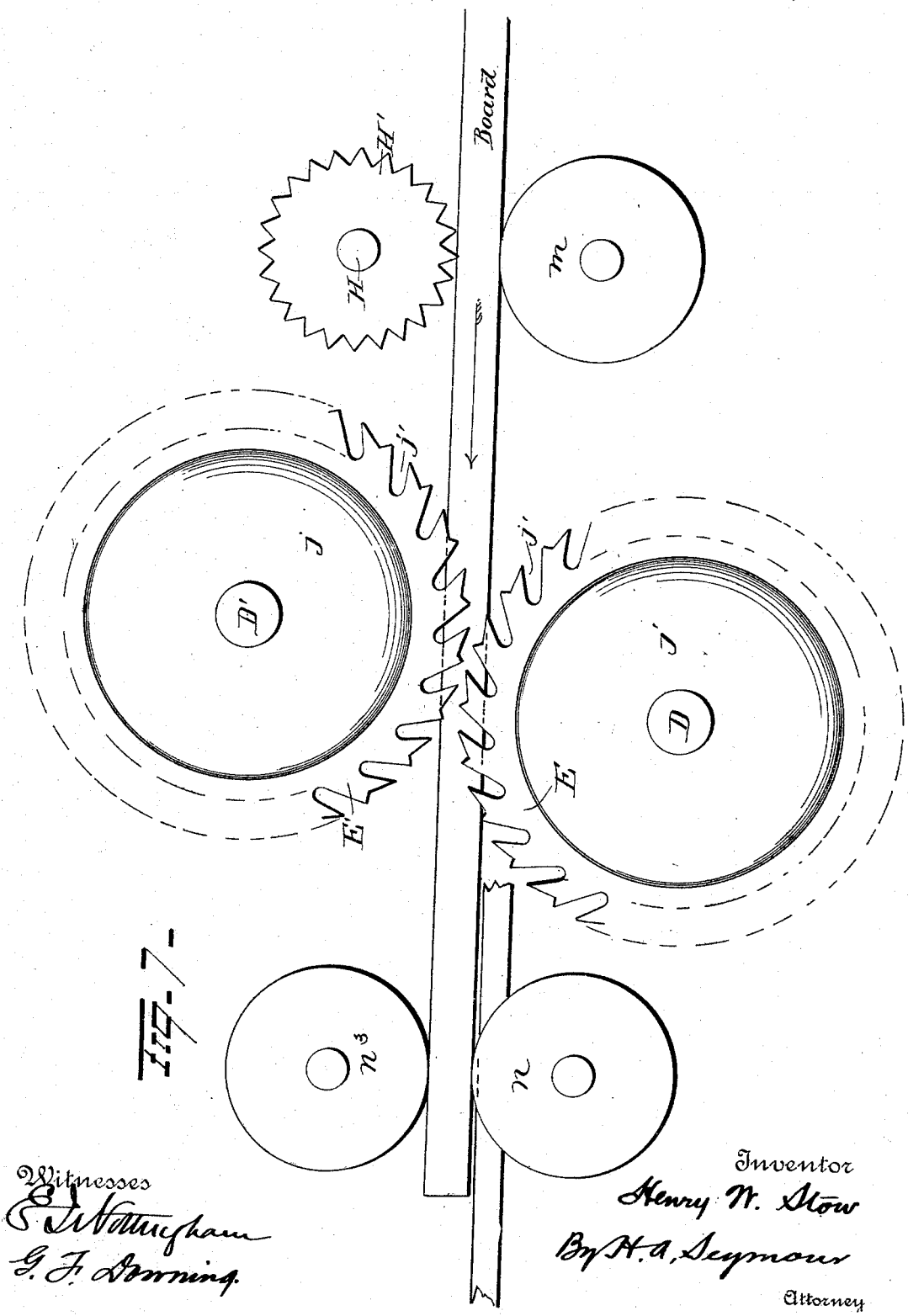

UNITED STATES PATENT OFFICE.

HENRY W. STOW, OF NEW HAVEN, CONNECTICUT; THEODORE F. BOOTH ADMINISTRATOR OF SAID STOW, DECEASED.

MACHINE FOR RIPPING OR DIVIDING BOARDS.

SPECIFICATION forming part of Letters Patent No. 518,655, dated April 24, 1894.

Application filed August 25, 1892. Serial No. 444,132. (No model.)

*To all whom it may concern:*

Be it known that I, HENRY W. STOW, a resident of New Haven, in the county of New Haven and State of Connecticut, have invented certain new and useful Improvements in Machines for Ripping or Dividing Boards; and I do hereby declare the following to be a full, clear, and exact description of the invention, such as will enable others skilled in the art to which it appertains to make and use the same.

My invention relates to an improvement in board rippers.

It has been found from practical experience that by the use of machines for dividing boards as previously employed, a large percentage of the lumber has been wasted in the process of dividing the boards and planks and jointing the edges thereof in a planing machine after the rough sawing. The lumber was wasted in the process of sawing and planing in saw dust and shavings, which reduced the width of the boards quite a large percentage. With the process of dividing boards as previously practiced, a loss of three-sixteenths of an inch occurred in the saw-kerf and then the saw would leave the two edges of the board rough, necessitating running it through the planing machine for smoothing or jointing, which required a removal of one-sixteenth of an inch from each edge. Thus every cut necessitated a loss of five-sixteenths of an inch of the timber.

It is the object of my invention to obviate these disadvantages of previous machines and to construct a machine for ripping boards or planks, whereby the loss in saw-dust and shavings will be reduced to a minimum.

A further object is to construct the saws in such manner that a very narrow kerf will be made thereby in the boards.

A further object is to produce a machine for ripping or dividing boards or planks, which shall be simple in construction, automatic in operation, effectual in the performance of its functions and capable of very rapid operation and results.

With these objects in view the invention consists in certain novel features of construction and combinations and arrangements of parts as hereinafter set forth and pointed out in the claim.

Figure 1:
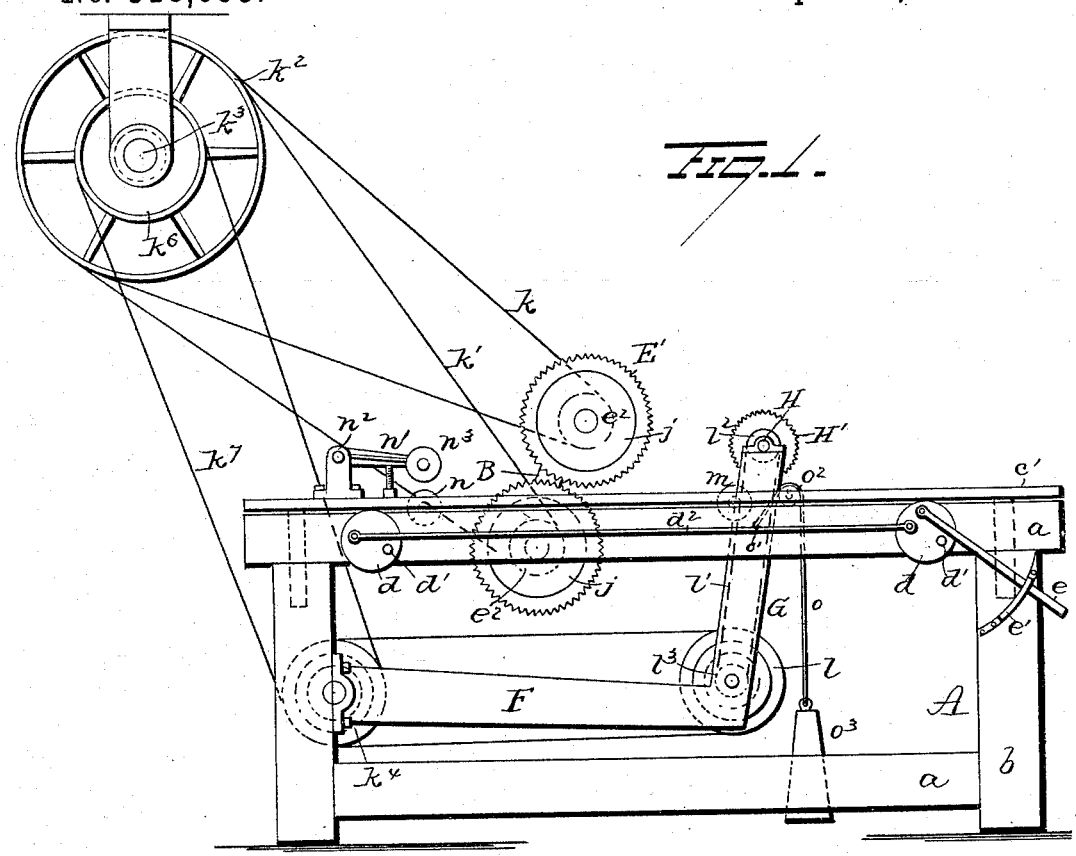
Figure 3:
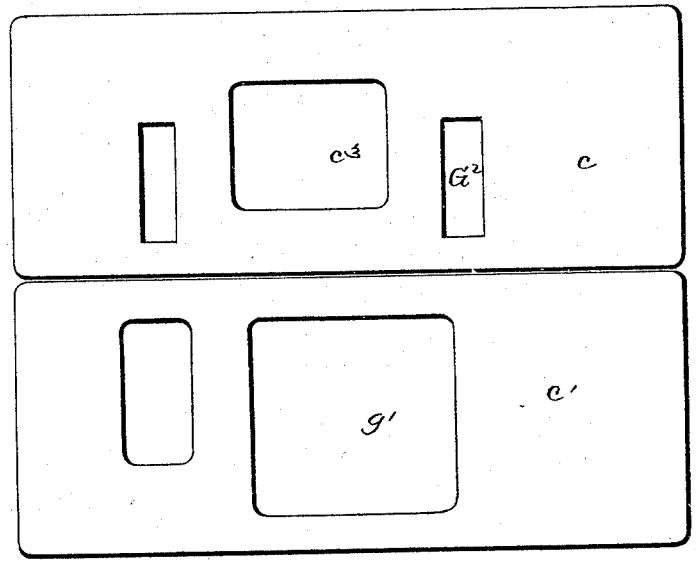

In the accompanying drawings: Figure 1 is a side elevation of my improved machine, with the yoke for supporting the saws removed. Fig. 2 is an elevation of the other side of the machine, showing means for adjusting the yoke which carries the saws. Fig. 3 is a plan view illustrating the bed plate and table. Fig. 4 is an end view showing the upper portion of the feed arm or bracket broken away. Fig. 5 is an end view illustrating the feed mechanism. Fig. 6 is a side view with portions removed, and showing the devices for raising and lowering the table, the feed arm or bracket and rear top guide roll. Fig. 7 is an enlarged view of a portion of the saws showing their relation to the board being sawed. Fig. 8 is an enlarged plan view of the yoke.

A represents a frame comprising timbers $a$ and legs $b$, and supports a stationary bed plate $c$ and an adjustable table $c'$, said bed plate and table being arranged side by side as shown in Figs. 3, 4 and 5. The table $c'$ is provided with depending guide rods $c^2$ adapted to loosely enter suitable guides in the frame. At each side of the frame A two or more eccentrics $d$ are carried by shafts $d'$ and the eccentrics at each side of the machine are connected by rods $d^2$ eccentrically pivoted thereto, said eccentrics being adapted to bear against the under face of the table $c'$. Secured to one of the eccentrics $d$ at a point in proximity to its periphery is a lever $e$, which extends therefrom parallel with one face of one of the legs $b$ and is adapted to engage a ratchet bar $e'$ carried by said leg whereby it is locked. By operating the lever $e$ the eccentrics $d$ can be oscillated to raise or lower the table $c'$ and said table may be retained at the desired elevation by the engagement of the dog on the lever with the ratchet bar $e'$.

The bed plate $c$ is made with an opening $c^3$ for the accommodation of a yoke B, said yoke being provided at its ends with integral journals $f$, supported in suitable journal boxes on the bed plate. By thus mounting the yoke it may be adjusted or swung, for a purpose which will presently appear, and will be retained at the desired adjustment by means of a set screw $f'$ adapted to engage one of the journals $f$. In order to provide simple and efficient means for swinging or adjusting the yoke to adjust the portion of the saws carried thereby as hereinafter explained, the yoke is provided at one end with an arm $h$ carrying a swiveled nut $h'$. A rod or shaft $h^2$ having a crank $h^3$ at one end, is mounted in suitable brackets $h^4$ on the frame A. The rod or shaft $h^2$ is provided at its lower end with screwthreads $h^5$ and passes through the nut $h'$. By turning the shaft $h^2$ the yoke B may be easily and quickly adjusted.

The yoke B is made at its ends with laterally and outwardly projecting arms 1, 2, 3, 4, each of which is provided with a journal bearing $i$ for the accommodation of shafts D, D′, the shaft D being mounted in the bearings on the arms 1 and 2 and the shaft D′ being mounted in the bearings on the arms 3 and 4. At the free ends of the shafts D, D′ are circular saws E, E′, the saw E being located beneath the table top and adapted to project through the same sufficiently to pass a little more than half way through the material being divided, while the saw E′ is located above the table and adapted to complete the severance of the said material,—the table being provided with an opening $g'$ (Fig. 3) for the accommodation of the saws. By the employment of a top saw adapted to act in conjunction with the bottom saw to sever a board, very thin saws may be made to very effectually accomplish the purpose for which thick saws were formerly employed. If a thin saw were used with machines as previously constructed, it would quickly heat the disk and become destroyed by friction against the edges of the board.

With my machine I am enabled to use very thin saws, not more than one-sixteenth of an inch thick, and as a very small portion of the saws enter the material being acted upon, such very thin saws will be braced or stiffened by means of flanges or plates $j$ on each face of the saws, said flanges or plates extending throughout the greater portion of the faces of the saws as shown in Fig. 1.

The teeth of the saws E, E′ are so formed that when in operation, the throats or gullets $j'$ will be open above and below the board as shown in Fig. 7, thus allowing a free escape for saw dust and affording free action to the saws. The teeth of each saw are preferably made alternate rip and cut-off teeth.

The shafts D, D′ may be made of such length as to receive three or more saws, when it is desired to cut a board into strips, in which case the saws on each shaft will be separated by suitable collars. By this means several strips may be cut at once, the width of the strips being governed by the length of the collars between the saws.

Both the upper and lower saws E, E′ will be driven (by means of devices presently explained) toward the board to be divided as it is fed to them, so that the teeth of the saws will cut from the inside of the boards outwardly or toward the surface of the board,—thus avoiding contact of the points of the teeth with any dirt or grit which may be on the surface,—whereby the too rapid wearing and dulling of the teeth will be avoided.

The shaft D′ which carries the saw E′ has secured to one end, a pulley $e^2$, a similar pulley $e^3$ being carried by the shaft D, at a point between its ends. Over these pulleys, bands $k$, $k'$ run, said bands also passing over a pulley $k^2$ mounted on a shaft $k^3$ to which motion is imparted in any suitable manner.

Mounted in suitable brackets secured to the forward uprights or legs of the frame A, is a cone pulley $k^4$, and pivotally connected with the journals of said cone pulley, are two arms F, from the inner ends of which arms G project upwardly, said arms F, G constituting a pivotally connected frame, in the upper end of which a shaft H is mounted, said shaft carrying one or a series of spur feed wheels H′, and the arm G projecting through a suitable opening $G^2$ in the bed plate $c$. A cone pulley $l$ is mounted at the junction of the arms F, G and adapted to transmit changes in motion to the spur feed by means of a belt $l'$, which passes over a pulley $l^2$ on the shaft H and a pulley $l^3$ on the shaft of the cone pulley $l$. The cone pulley $l$ receives motion from the cone pulley $k^4$, through the medium of a strap $k^5$ and the cone pulley $k^4$ receives motion from a pulley $k^6$ on the shaft $k^3$, by means of a strap $k^7$. A guide roller $m$ is carried by the table $c$ under the feed wheel H and mounted in the table at the opposite side of the saws, is a guide roller $n$. An arm $n'$ is pivotally supported by brackets $n^2$ on the table $c'$, and carries a guide roller $n^3$ adapted to bear on the board being sawed, immediately over the guide roller $n$. In order to balance the frame which carries the feed wheel H′, a cord $o$ is attached thereto at $o'$ or at any desired point below the table, and after passing over a pulley $o^2$ carried by the table, extends downwardly and is provided at its free end with a weight $o^3$.

It will be seen that by having both saws on a solid yoke, and mounting said yoke in such manner that it is capable of being swung or adjusted, the saw below the table can be made to rise, and the saw above the table be made simultaneously to fall whenever adjustment may be necessary on account of the wearing away of the saw teeth and to cause the teeth of the lower saw to penetrate half through the board and enter the cut of the upper saw, thus making a complete division of the board. It will also be seen that the saw table is geared to rise and fall according to the thickness of the lumber to be ripped, it being desirable that the lower saw should cut half through the board, hence the need of such adjustment of the table.

As above pointed out by using the machines for dividing boards as previously constructed, at least five-sixteenths of an inch is lost at each cut. By means of the machine above described, only one-sixteenth of an inch will be lost, thus saving one-fourth of an inch on every cut, over such previous machines.

I have found from practical experience that when I divide a board ten or twelve inches wide into three parts, I save one-half inch in width of the board. This economy amounts to quite ten per cent. If lumber is worth twenty dollars per thousand, then I save two dollars per thousand. If I work up twenty thousand feet per day, I save forty dollars per day by my machine. From this it will be seen that a great saving in material will be had by the use of the machine above described.

The machine is very simple in construction and effectual in the performance of its functions.

Having fully described my invention, what I claim as new, and desire to secure by Letters Patent, is—

The combination with a frame, a stationary and adjustable table, said tables having openings therein, of a yoke axially supported and carrying shafts, said shafts having cutters thereon, means for setting and locking the yoke, L-shaped arms pivoted at one end to the frame and their upper ends passing up through an opening in the stationary table, a shaft journaled in the upper ends of these L-shaped arms and carrying feed wheel above the table, means for balancing these arms and for driving the saws and feed wheel, substantially as set forth.

In testimony whereof I have signed this specification in the presence of two subscribing witnesses.

HENRY W. STOW.

Witnesses:
JAMES H. WEBB,
SAMUEL C. MOREHOUSE.